Patented Dec. 11, 1928.

1,695,249

UNITED STATES PATENT OFFICE.

GEORGE O. CURME, JR., AND ERNEST W. REID, OF PITTSBURGH, PENNSYLVANIA, ASSIGNORS, BY MESNE ASSIGNMENTS, TO CARBIDE AND CARBON CHEMICALS CORPORATION, OF NEW YORK, N. Y., A CORPORATION OF NEW YORK.

PROCESS OF MAKING ISOPROPYL ALCOHOL.

No Drawing. Application filed July 19, 1919. Serial No. 312,070.

This invention is a process of making isopropyl alcohol from propylene.

It is known that propylene is absorbed by 100% sulfuric acid with formation of di-isopropyl sulfate, an unstable oily liquid, the transformation being represented by the equation $$2C_3H_6 + H_2SO_4 = (C_3H_7)_2SO_4.$$

On a laboratory scale the above absorption occurs readily and rapidly. We have found however that this reaction is very highly exothermic, the heat development corresponding substantially to the heat of dilution of the sulfuric acid used for the absorption, so that practically no further heat evolution takes place upon diluting the product. If the reaction be permitted to proceed without careful temperature control the di-isopropyl sulfate becomes polymerized to a black tarry mass. However by cooling the concentrated sulfuric acid previous to and during the absorption to a temperature between $-10°$ C. and $0°$ C., this polymerization is avoided and the absorption is practically complete in five to six hours. If desired, the temperature may be permitted to rise to $15°$ or $20°$ C. as the reaction approaches completion. The absorption may be carried out in any appropriate type of apparatus, and either intermittently or in continuous flow as regards both the acid and the gas. For example the gaseous propylene may be bubbled repeatedly through the acid bath maintained at the appropriate temperature; or it may flow in countercurrent to the cooled acid in any suitable type of tower or other absorptive device. Phosphoric acid may replace sulfuric acid for this purpose. In practice the absorption of the gas is preferably continued until the liquid product contains upward of 80% di-isopropyl sulfate.

The resulting liquid is a nearly colorless oily body, heavier than water and immiscible therewith: standing in contact with water it reacts very slowly therewith at room temperature, undergoing hydrolysis. We have found however that when the oily liquid is thoroughly emulsified with water by sufficient stirring, preferably in the proportion of about 4 parts of water per part of oil, it is practically completely hydrolyzed, or at least is practically completely dissolved, in the course of three to four hours. The temperature may be permitted to rise to about $40°$ C., particularly toward the end of the operation. At temperatures materially higher than this the di-isopropyl sulfate tends to undergo polymerization, yielding tarry products as mentioned above. When the operation is properly carried out the product of the hydrolysis is a substantially colorless, homogeneous liquid consisting essentially of isopropyl alcohol, sulfuric acid (or phosphoric acid) and water.

We distill off the isopropyl alcohol from this mixture, obtaining thereby a distillate containing 40–70% of alcohol. This we rectify, preferably in presence of a small proportion of caustic soda or other alkali, to combine with traces of $SO_2$, producing thereby in a single rectification a commercial constant-boiling mixture containing approximately 86% of isopropyl alcohol. The concentration of this alcohol may be further increased, or absolute alcohol may be prepared by distilling over lime, as is customary in the case of ethyl alcohol.

The residual acid solution should be clear and practically colorless if the operation has been properly performed, and may readily be concentrated in accordance with commercial methods.

What we claim is:—

1. In a process of making isopropyl alcohol, the step which consists in hydrolyzing di-isopropyl sulfate, while maintaining the same in emulsification with water.

2. In a process of making isopropyl alcohol, the step which consists in hydrolyzing di-isopropyl sulfate, while maintaining the same in emulsification with water and, by regulated cooling, at a temperature below the point at which substantial proportions of tarry polymerization products are formed.

In testimony whereof, we affix our signatures.

GEORGE O. CURME, JR.
ERNEST W. REID.